United States Patent [19]

Markovs

[11] Patent Number: 5,281,259
[45] Date of Patent: Jan. 25, 1994

[54] REMOVAL AND RECOVERY OF MERCURY FROM FLUID STREAMS

[75] Inventor: John Markovs, Yorktown Heights, N.Y.

[73] Assignee: UOP, Des Plaines, Ill.

[21] Appl. No.: 992,316

[22] Filed: Dec. 21, 1992

[51] Int. Cl.⁵ .............................................. B01D 53/04
[52] U.S. Cl. ........................................ 95/134; 95/125; 95/141; 95/902
[58] Field of Search .................... 55/31, 33, 59, 62, 72, 55/74, 75

[56] References Cited

U.S. PATENT DOCUMENTS

| | | | |
|---|---|---|---|
| 3,755,989 | 9/1973 | Fornoff et al. | 55/72 |
| 4,101,631 | 7/1978 | Ambrosini et al. | 423/210 |
| 4,484,933 | 11/1984 | Cohen | 55/33 X |
| 4,487,614 | 12/1984 | Yon | 55/33 |
| 4,783,203 | 11/1988 | Doshi | 55/62 X |
| 4,863,494 | 9/1989 | Hayes | 55/59 |
| 4,874,525 | 10/1989 | Markovs | 210/673 |
| 4,877,515 | 10/1989 | Audeh | 55/59 X |
| 4,892,567 | 1/1990 | Yan | 55/33 |
| 4,971,606 | 11/1990 | Sircar et al. | 55/59 X |
| 4,985,052 | 1/1991 | Haruna et al. | 55/62 X |
| 5,089,034 | 2/1992 | Markovs et al. | 55/62 X |
| 5,090,973 | 2/1992 | Jain | 55/62 X |

OTHER PUBLICATIONS

Barrer et al., J. Chem. Soc. (1967) pp. 19–25.

Primary Examiner—Robert Spitzer
Attorney, Agent, or Firm—Thomas K. McBride; Richard G. Miller

[57] ABSTRACT

In the purification of natural gas streams to remove mercury by adsorption procedures, environmental pollution is avoided by using a condenser in conjunction with the adsorption beds in a manner such that the mercury vapor contained in the purge gas used to regenerate the adsorption beds is covered entirely as a liquid rather than being vented from the purification system as mercury vapor.

8 Claims, 1 Drawing Sheet

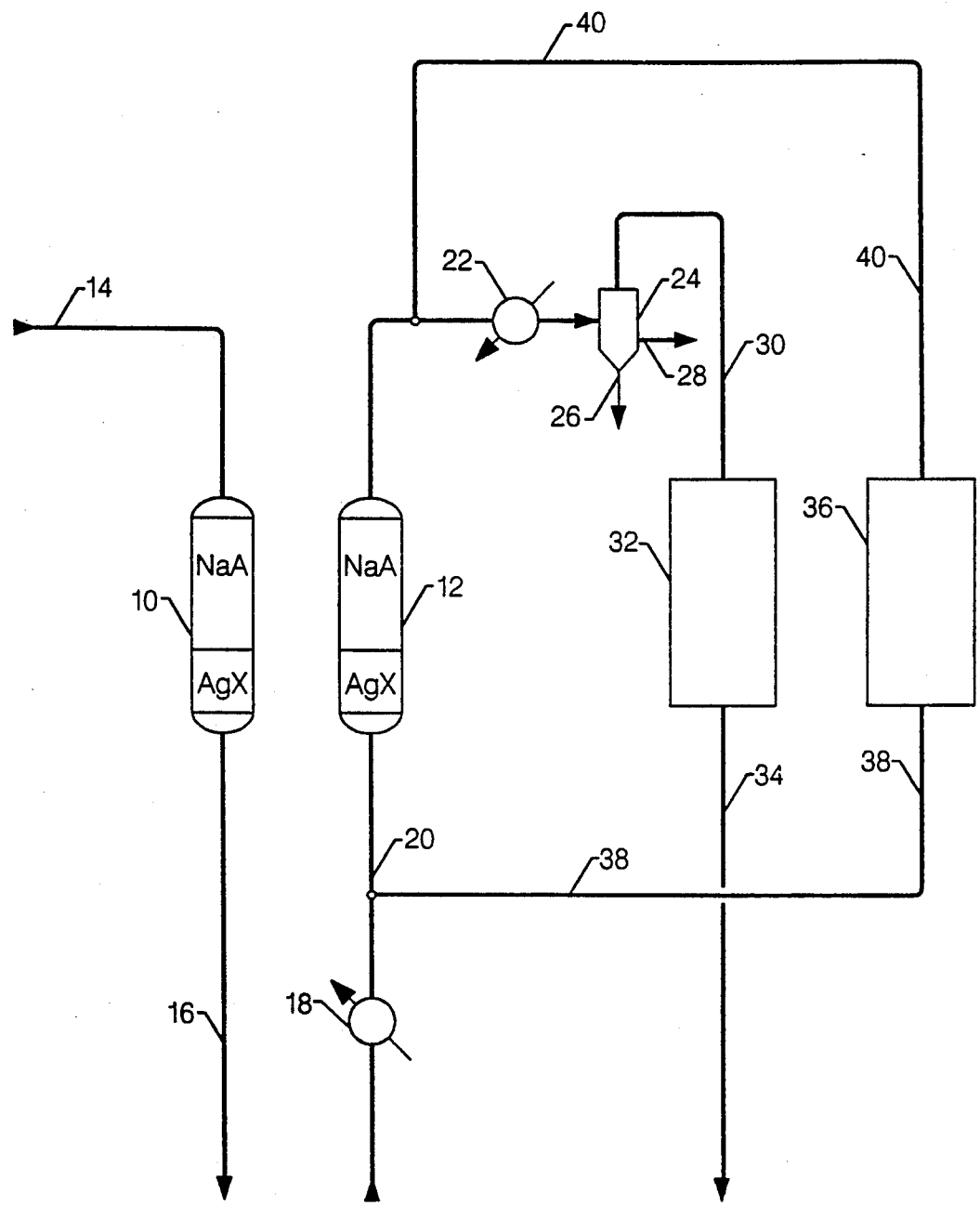

REMOVAL AND RECOVERY OF MERCURY FROM FLUID STREAMS

FIELD OF THE INVENTION

The present invention relates in general to the purification of fluid streams containing mercury and more particularly to adsorption of mercury from such streams using an integrated system of at least one cyclically regenerated primary fixed adsorbent bed to remove the mercury from the feedstock, a condenser which initially treats and removes condensed mercury from the regeneration effluent from the primary fixed bed and a secondary fixed bed which serves to lower the mercury content of the overhead effluent from the condenser to a degree sufficient to permit the reintroduction of the product stream into the environment on a non-polluting basis. The process is particularly useful in the treatment of natural gas streams. Most of the mercury present in the feed stream is recovered as a separate liquid stream.

BACKGROUND OF THE INVENTION

Mercury is an undesirable constituent of many process streams and of all natural gas streams, and consequently a considerable number of methods have been devised to selectively remove the mercury. In the main the mercury impurity is in the form of elemental mercury, but in at least some instances mercury compounds, including organic mercury compounds, are also present. The purification processes are largely adsorption procedures, and in these the most common type of adsorbent is an activated carbon having supported thereon a mercury reactive material such as potassium triodide, sulfur, sulfuric acid, chlorine, silver, copper or various salts of silver or copper. Other supports for the mercury reactive materials include silicas, aluminas, silica-aluminas and zeolitic aluminosilicates. Ion-exchange resins, particularly the strongly basic anion-exchange types which have been reacted with a polysulfide, have also been reported as useful mercury adsorbents. See U.S. Pat. No. 4,591,490 (Horton) in this latter regard. The disclosures of U.S. Pat. No. 4,500,327 (Nishino) and U.S. Pat. No. 4,196,173 (de Jong et al) are pertinent to the use of activated carbon supports.

Perhaps the two greatest problems involved in removing mercury from process streams are (a) achieving a sufficient reduction in the mercury concentration of the feed stream being treated, and (b) avoiding the reentry of the recovered mercury into some other environmental medium. Although permissible levels of mercury impurity vary considerably, depending upon the ultimate intended use of the purified product, for purified natural gas, a mercury concentration greater than about 0.01 microgram per normal cubic meter ($\mu g/nm^3$) is considered undesirable, particularly in those instances in which the natural gas is to be liquefied by cryogenic processing. To attain lower concentration levels requires the use of relatively large adsorption beds and relatively low mercury loadings. If non-regenerable, the capital and adsorbent costs are uneconomical, and if regenerable, the regeneration media requirements are not only large but result in a large mercury-laden bed effluent which must itself be disposed of in an environmentally safe manner.

THE DRAWINGS

The sole FIG. of the drawings is a schematic flow diagram showing one embodiment of the process system used in the practice of this invention.

SUMMARY OF THE INVENTION

In accordance with the present invention the process comprises: (a) providing a fluid stream containing a mercury impurity in an amount of at least 0.02, and preferably at least 2.0, $\mu g/nm^3$ of mercury calculated as elemental mercury; (b) passing said stream into a first fixed adsorption bed containing an adsorbent on which said mercury impurity is preferentially adsorbed whereby a mercury mass transfer front is established and a mercury-depleted fluid stream is recovered as the effluent therefrom; (c) terminating the flow into said first adsorption bed prior to breakthrough of the mercury mass transfer front; (d) regenerating said first fixed bed by passing thereunto, preferably in a direction countercurrent to the direction of flow therethrough during step (b), a purge desorption stream whereby mercury impurity is desorbed and removed from said bed in the effluent; (e) cooling said effluent in step (d) to condense out and recover at least a portion of the mercury content thereof and passing the remaining mercury-depleted effluent to a second fixed adsorbent bed containing an adsorbent for said mercury impurity whereby a mercury mass transfer zone is established and a product effluent further depleted in mercury is recovered; (f) terminating the flow into said second adsorption bed prior to breakthrough of the mercury mass transfer front; (g) regenerating said second fixed bed by passing therethrough, preferably in a direction countercurrent to the direction of flow therethrough during step (e), a purge desorption stream, preferably one having essentially the same chemical composition as the purge stream used for the desorption of the first bed in step (d), and combining the regeneration effluent therefrom with the effluent in step (d).

DETAILED DESCRIPTION OF THE INVENTION

The mercury-containing fluid stream suitably treated by the present process can be either in the liquid or the vapor state. The constituents other than mercury and/or a mercury compound are not critical except in those cases in which such constituents seriously attack the particular adsorbents involved in the process and render same incapable of functioning to selectively adsorb and retain mercury. Typical streams are natural gas streams, which can contain as high as 22 parts per billion (vol.) mercury vapor along with carbon dioxide, water vapor, hydrogen and higher hydrocarbons as impurities, by-product hydrogen streams from the commercial production of chlorine by the electrolysis of sodium chloride using a mercury-containing electrode, helium and other inert gases, furnace stack gases, battery disposal incinerator gases, air, hydrocarbons such as ethylene (cracked gas), light and heavy naphtha fractions, liquified petroleum gas, dripolene and the like. The feedstocks are suitably processed by the present process in the temperature range of 0° C. to 65° C. and using pressures of from atmospheric to 2500 psia.

The particular adsorbent employed in either the primary or the secondary bed is not a critical factor. Any of the adsorbents well known in the art for adsorbing mercury impurities and which can be thermally regenerated can be utilized. Since, however, both beds are periodically, i.e., cyclically, regenerated in the practice of the present process, the capacity of the adsorbent to adsorb the mercury impurity is less important than the property of having a strong affinity for the mercury impurity which is employed. Thus, preferred adsorbents are those which comprise constituents chemically reactive with mercury or mercury compounds. Various cationic forms of several zeolite species, including both naturally occurring and synthesized compositions, have been reported by Barrer et al [J. Chem. Soc. (1967) pp. 19–25] to exhibit appreciable capacities for mercury adsorption due to the chemisorption of metallic mercury at the cation sites. Some of these zeolitic adsorbents reversibly adsorb mercury and others exhibit less than full, but nevertheless significant, reversibility. An especially effective adsorbent for use in the present process is one of the zeolite-based compositions containing cationic or finely dispersed elemental forms of silver, gold, platinum or palladium. A particularly preferred adsorbent of this type is disclosed in U.S. Pat. 4,874,525 (Markovs) wherein the silver is concentrated on the outermost portions of the zeolite crystallites. This adsorbent, as well as the other zeolite-based adsorbents containing ionic or elemental gold, platinum or palladium, is capable of selectively adsorbing and sequestering organic mercury compounds as well as elemental mercury. Zeolite A containing elemental gold is disclosed as an adsorbent for mercury in the later issued U.S. Pat. No. 4,892,567 (Yan). The specific mention of these materials is not intended to be limitative, the composition actually selected being a matter deemed most advantageous by the practitioner given the particular circumstances to which the process is applied.

While the purge regeneration medium for the primary and the secondary beds advantageously has the same composition and is a portion of the purified product from the primary bed, other regeneration media, well known in the art, both sorbable and non-sorbable, can be utilized. It is preferred, however, that the regeneration medium is a so-called non-sorbable substance such as methane, nitrogen, hydrogen and the like whose presence in the purified product stream is not objectionable. Particularly preferred are portions of the purified product streams from which the more strongly adsorbed materials, if any, have been removed. Thus in the case of treating natural gas to remove mercury, the purified product may contain minor amounts of $C_2+$ hydrocarbons which are more strongly adsorbed on zeolites than is methane. The removal of some or all of these higher hydrocarbons is preferred before the purified methane is employed as the purge medium. Similar circumstances may arise in the removal of mercury from other feedstocks in which the purified product is a mixture of two or more compounds.

In carrying out the present process it will be understood that for continuous operation over an appreciable period it is necessary that there be at least two primary beds and two secondary beds in order that one primary and one secondary bed can be regenerated while the other two are engaged in removing mercury by selective adsorption. While highly desirable, continuous operation is not, however, essential in the practice of the present invention.

The temperature and pressure conditions for the cyclic adsorption and regeneration steps in each bed are not critical and depend to some degree upon the particular feedstock being purified and whether the process is to be carried out in the liquid or in the range phase. In treating natural gas or other hydrocarbon streams, temperatures typically range from about 16° C. to 60° C. in the beds during the adsorption-purification step. During regeneration the purge medium is heated to at least 100° C., and preferably at least 200° C., higher than the temperature of the feedstock being purified. Pressure conditions can range from 20 to 2500 psia and are generally not critical, except of course during liquid phase operation wherein it is necessary to maintain sufficient pressure at the operating temperature to avoid vaporization of the feedstock and regeneration medium.

In treating the mercury-containing effluent from a primary bed during bed regeneration to condense out liquid mercury, conventional cooling and knock-out apparatus is suitably employed. The temperature to which the regeneration effluent is cooled during this procedure is preferably not greater than 55° C. and is advantageously as low as economically practical taking into account the chemical composition of the fluid stream being treated. In those instances in which the fluid stream contains water and/or carbon dioxide in addition to hydrocarbons, such as is typically the case with natural gas, the temperature and pressure conditions must be correlated to avoid undue formation of hydrocarbon hydrate or $CO_2$ hydrate formation.

A preferred embodiment of the present invention is illustrated by the following example together with the flow diagram of the drawings. In the flow diagram the process system is represented by dual primary adsorption beds integrated with dual secondary beds in a manner that continuous operation can be carried out by regenerating one primary and one secondary bed while the other two beds are involved in the adsorption of mercury. It will be understood by those of routine skill in the art that not all of the conduits and valves which would be present in an actual process system are shown in the flow diagram. The placement of these flow-directing means is largely dependent upon the placement of the essential adsorption beds and is not a matter necessary to an understanding of the process. In this embodiment the feedstock being treated for mercury removal is a $CO_2$-free natural gas stream containing water vapor. The process is carried out in the vapor phase. Since all of the mercury adsorbents employed in the present process will also adsorb water and higher hydrocarbons, it is advantageous to employ a composite fixed adsorbent bed which contains in the bed section first contacted by the stream being treated an adsorbent relatively free of cations or compounds strongly reactive with mercury but which exhibits a strong affinity and an appreciable capacity for water adsorption. The alkali metal aluminosilicate zeolites, such as sodium zeolite A and sodium zeolite X, are very useful in this regard. A subsequent, i.e., downstream, zone of the adsorption bed is loaded with an adsorbent, such as silver-exchanged zeolite A or zeolite X, which has a high capacity for mercury. A composite bed of this kind is disclosed in U.S. Pat. 4,874,525. Such a bed is utilized as the primary bed in the process illustrated below:

With reference to the drawing, primary composite beds 10 and 12 each contain 49,000 pounds of ⅛" extruded sodium zeolite A pellets in the upper zone, and in the lower zone 7,970 pounds of ⅛" extruded zeolite X pellets having 13.6 weight percent silver as zeolite cations, 95 percent of which are located within 0.1 millimeters of the external surface of the pellets. Natural gas, from which $CO_2$ has previously been removed, containing 649 ppm(v) water vapor, 14 parts per billion [ppb(v)] mercury vapor and about 5 volume percent $C_2$–$C_7$ hydrocarbons, is passed into bed 10 through line 14 at a pressure of 722 psia, a temperature of 21° C. and a superficial space velocity of 35.3 feet per minute. Water vapor is adsorbed in the upper zone on the NaA zeolite. The resulting dried natural gas containing the mercury vapor then passes through the lower zone containing the AgX zeolite whereby the mercury content is reduced to less than 10 parts per trillion and is recovered through line 16. During the adsorption step in bed 10, bed 12, which has previously undergone the same adsorption purification step as in bed 10, is undergoing regeneration. A portion of the purified product natural gas from bed 10 is passed through heater 18, wherein it is heated to 290° C., and a portion of the heated gas stream is directed at a pressure of 295 psia through line 20 countercurrently through bed 12. Mercury, water vapor and some $C_2$–$C_7$ hydrocarbons are desorbed from the two adsorption zones of the bed and the effluent is directed through chiller 22 in which the temperature is reduced to about 70° F. Under the existing pressure conditions, 290 psia, the formation of hydrocarbon hydrates is avoided so that in separator 24 condensed mercury vapor is removed as a liquid through line 26 and condensed water vapor is withdrawn through line 28. The vapor phase stream comprising principally methane saturated with water vapor and containing about 730 $\mu g/nm^3$ mercury vapor is then passed at a temperature of about 70° F. through line 30 into bed 32 which contains 2100 pounds of the same AgX pellets as in the lower zone of the primary beds 10 and 12. The effluent stream leaving bed 32 through line 34 is essentially free of mercury vapor, i.e., contains less than 0.1 $\mu g/n^3$ mercury vapor. This effluent can safely be burned as fuel to provide heat energy for the process operation, be sold as a commercial product, recirculated for use as a regenerant stream in the process, and the like. During the adsorption step in bed 32, bed 36 containing the same quantity and kind of adsorbent as in bed 32, is regenerated to remove the adsorbed mercury. This regeneration is accomplished countercurrently using the portion of purified natural gas passing through heater 18 which is not utilized in the regeneration of primary bed 12. This regeneration gas stream passes through line 38 and through bed 36 at a temperature of 290° C. The effluent stream from bed 36 contains desorbed mercury and some water vapor, and is recycled through line 40 to join the effluent from primary bed 12 during the regeneration step therein. Its mercury content is significantly reduced by virtue of passage through condenser 22 and knock-out 24 as described hereinabove. Because the regeneration gas flow rate is less than the flow rate of the process feed stock entering the system, it is possible by routine means to integrate the overall process so that no increase in regeneration gas flow rate is required for the regeneration of both the primary and the secondary beds.

As will be readily apparent to those of routine skill in the art in view of the foregoing, a number of modifications of the illustrated process scheme can be made without departing from the proper scope of this invention.

What is claimed is:

1. Process for removing mercury impurities from fluid streams which comprises the steps of:
   (a) providing a fluid stream containing a mercury impurity in an amount of at least 0.02 $\mu g/nm^3$ of mercury calculated as elemental mercury;
   (b) passing said stream into a first fixed adsorption bed containing an adsorbent on which said mercury impurity is preferentially adsorbed whereby a mercury mass transfer front is established and a mercury-depleted fluid stream is recovered as the effluent therefrom;
   (c) terminating the flow into said first fixed adsorption bed prior to breakthrough of the mercury mass transfer front;
   (d) regenerating said first fixed adsorption bed by passing therethrough a purge desorption stream whereby mercury impurity is desorbed and removed from said first fixed adsorption bed in the effluent;
   (e) cooling said effluent in step (d) to condense out and recover a portion of the mercury content thereof and passing the remaining mercury-depleted effluent to a second fixed adsorption bed containing an adsorbent for said mercury impurity whereby a mercury mass transfer front is established and a product effluent further depleted in mercury is recovered;
   (f) terminating the flow into said second fixed adsorption bed prior to breakthrough of the mercury mass transfer front;
   (g) regenerating said second fixed adsorption bed by passing therethrough a purge desorption stream and combining the regeneration effluent therefrom with the effluent from the first fixed adsorption bed produced in step (d).

2. Process according to claim 1 wherein in step (d) the purge desorption stream is passed through said first fixed adsorption bed in a direction countercurrent to the flow therethrough in step (b).

3. Process according to claim 2 wherein in step (g) the purge desorption stream is passed through said second fixed adsorption bed in a direction countercurrent to the flow therethrough in step (e).

4. Process according to claim 1 wherein the fluid stream from which the mercury impurity is removed is natural gas in the vapor phase.

5. Process according to claim 4 wherein the adsorbent in the first fixed bed comprises zeolite X containing ionic or elemental silver.

6. Process according to claim 4 wherein the mercury impurity comprises an organic compound of mercury.

7. Process according to claim 1 wherein the fluid stream for which the mercury impurity is removed is liquid naphtha.

8. Process according to claim 1 wherein the mercury is removed using adsorbents containing silver, gold, platinum or palladium.

* * * * *